United States Patent
Hsu et al.

(10) Patent No.: US 8,421,981 B2
(45) Date of Patent: Apr. 16, 2013

(54) DISPLAY PANEL AND PIXEL ARRAY SUBSTRATE WITH CONNECTING WIRES HAVING THROUGH-OPENING

(75) Inventors: Pai-Hung Hsu, Tainan County (TW); Chien-Hao Fu, Taipei County (TW); Chun-Huan Chang, Taipei County (TW); Ming-Chin Lee, Taipei County (TW); Min-Feng Chiang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 649 days.

(21) Appl. No.: 12/368,274

(22) Filed: Feb. 9, 2009

(65) Prior Publication Data
US 2010/0118249 A1    May 13, 2010

(30) Foreign Application Priority Data
Nov. 8, 2008  (TW) ............................... 97144540 A

(51) Int. Cl.
*G02F 1/1345* (2006.01)
*G02F 1/1339* (2006.01)
*H01J 9/32* (2006.01)

(52) U.S. Cl.
USPC .......... 349/152; 349/149; 349/151; 349/153; 349/190; 445/25

(58) Field of Classification Search .................. 349/153, 349/190, 149, 151; 345/104
See application file for complete search history.

(56) References Cited

U.S. PATENT DOCUMENTS

| | | | |
|---|---|---|---|
| 7,130,006 B2 * | 10/2006 | Chu et al. | 349/110 |
| 7,349,056 B2 | 3/2008 | Kim et al. | |
| 2002/0067456 A1 * | 6/2002 | Tatsumi | 349/149 |
| 2005/0190335 A1 * | 9/2005 | Maruyama et al. | 349/153 |
| 2008/0284963 A1 * | 11/2008 | Kamiya et al. | 349/139 |
| 2008/0309866 A1 * | 12/2008 | Huang et al. | 349/153 |

FOREIGN PATENT DOCUMENTS
TW    I263078    10/2006

OTHER PUBLICATIONS
"Office Action of Taiwan Counterpart Application", issued on Apr. 26, 2012, pp. 1-5.

* cited by examiner

*Primary Examiner* — Hoan C Nguyen
(74) *Attorney, Agent, or Firm* — Jianq Chyun IP Office

(57) ABSTRACT

A display panel having a display region and a sealant region is provided. The display panel includes a first substrate, a second substrate, a sealant and a display medium. The sealant is disposed between the first and second substrates and within the sealant region. The display medium is disposed between the first and second substrates and within the display region. The second substrate includes pixel units and wires electrically connected to the pixel units. The pixel units are disposed within the display region, the wires extend to the sealant region from the display region, and at least a portion of the wires in the sealant region has slots. In particular, each of the slots has a side edge adjacent to the edge of the wire which the slot is disposed therein, and the distances from the side edge to the edge of the wire are not equal.

20 Claims, 11 Drawing Sheets

DISPLAY PANEL AND PIXEL ARRAY SUBSTRATE WITH CONNECTING WIRES HAVING THROUGH-OPENING

CROSS-REFERENCE TO RELATED APPLICATION

This application claims the priority benefit of Taiwan application serial no. 97144540, filed on Nov. 18, 2008. The entirety of the above-mentioned patent application is hereby incorporated by reference herein and made a part of specification.

BACKGROUND OF THE INVENTION

1. Field of the Invention

The present invention relates to a display panel and a pixel array substrate. More particularly, the present invention relates to a display panel and a pixel array substrate in which the wires in the sealant region have specific slots.

2. Description of Related Art

With the rapid development of image display technologies, computer displays have changed gradually from the earlier cathode ray tubes (CRT) to the liquid crystal displays (LCD) in current times. The LCD includes two substrates and a liquid crystal layer, and a sealant is utilized to assemble the two substrates and prevents the liquid crystal layer from flowing out.

Generally, the sealant is first coated on the lower substrate, the liquid crystal layer is injected on the lower substrate, and then the two substrates are assembled. It should be noted that the upper substrate has a black matrix thereon, and the sealant is disposed corresponding to the black matrix. Hence, a back exposure process with ultraviolet from the back surface of the lower substrate is utilized to cure the sealant. However, because a portion of the sealant is covered by wires on the lower substrate, the sealant covered by the wires is not fully exposed by ultraviolet light. Thereby, slots are usually formed in the wires so as to increase the exposed area of the sealant covered by the wires.

Nonetheless, the slots designed in the wires are usually trapezoid slots and two side edges of the trapezoid slots are parallel to the edges of the wires because it is more convenient for designing or drawing a photo mask. That is to say, the slots have included angles lower than 90° between its side edges. If the photo mask is used in an exposure process, these included angles lower than 90° can not be accurately transferred into a photoresist, such that the slot patterns can not be accurately and completely transferred into the wires. In addition, if the included angles of the slots are not equal to 45° or 90°, or not equal to a multiple of 45° or 90, or the side edges of the slots are not on grid when drawing in the photo mask drawing software, errors are found from the design rule checking tool because the slots transferred from the photo mask are deformed, so that the aspect ratio is not meet the standard and the sealant may not be completely cured.

SUMMARY OF THE INVENTION

Accordingly, the present invention is directed to a display panel and a pixel array substrate capable of solving the slots can not be accurately and completely transferred into the wires from the photo mask in the prior art if the slots are formed in the wires covering by the sealant to increase the exposed area of the sealant. In addition, when the design rule checking is performed, errors found from the design rule checking tool can be avoided because the slots of the present invention transferred from the photo mask are not deformed.

The present invention is further directed to a display panel having a display region and a sealant region surrounding the display region is provided. The display panel includes a first substrate, a second substrate, a sealant and a display medium. The sealant is disposed between the first and second substrates and within the sealant region. The display medium is disposed between the first and second substrates and within the display region. The second substrate includes pixel units and wires electrically connected to the pixel units. The pixel units are disposed within the display region, the wires extend to the sealant region from the display region, and at least a portion of the wires in the sealant region has slots. In particular, each of the slots has a side edge adjacent to the edge of the wire which the slot is disposed therein, and the distances from the side edge to the edge of the wire are not equal.

According to an embodiment of the present invention, at least a portion of the wires has a turning part.

According to an embodiment of the present invention, the slots have a shape of rectangle, square, parallelogram, hexagon or octagon.

According to an embodiment of the present invention, the slots are parallel to each other.

According to an embodiment of the present invention, a portion of the slots is perpendicular to another portion of the slots.

According to an embodiment of the present invention, the areas of the slots are not the same.

According to an embodiment of the present invention, at least a portion of the wires has a turning part, and the slots are disposed at the turning part.

According to an embodiment of the present invention, the slots comprises rectangle slots, each of the rectangle slots has two short side edges and two long side edges, and the distances from the short side edge of the slot at the turning part to the edge of the wire which the slot is disposed therein are not equal.

According to an embodiment of the present invention, the slots comprises rectangle slots, each of the rectangle slots has two short side edges and two long side edges, the long side edges of a portion of the rectangle slots are perpendicular to the long side edges of another portion of the slots.

According to an embodiment of the present invention, the wires comprises data lines and scan lines.

According to an embodiment of the present invention, the sealant comprises an ultraviolet curing sealant or a visible light curing sealant.

According to an embodiment of the present invention, the first substrate further comprises a shading pattern layer thereon, and the shading pattern layer is disposed within the display region and the sealant region.

A pixel array substrate including a substrate, a plurality of pixel units and a plurality of wires are provided. The substrate has a display region and a sealant region. The pixel units are disposed in the display region. The wires are electrically connected to the pixel units and extend to the sealant region from the display region. At least a portion of the wires in the sealant region has slots. In particular, each of the slots has a side edge adjacent to the edge of the wire which the slot is disposed therein, and the distances from the side edge to the edge of the wire are not equal.

According to an embodiment of the present invention, at least a portion of the wires has a turning part.

According to an embodiment of the present invention, the slots have a shape of rectangle, square, parallelogram, hexagon or octagon.

According to an embodiment of the present invention, the slots are parallel to each other.

According to an embodiment of the present invention, a portion of the slots is perpendicular to another portion of the slots.

According to an embodiment of the present invention, the areas of the slots are not the same.

According to an embodiment of the present invention, the wires comprises data lines and scan lines.

According to an embodiment of the present invention, at least a portion of the wires has a turning part, and the slots are disposed at the turning part.

According to an embodiment of the present invention, the slots comprises rectangle slots, each of the rectangle slots has two short side edges and two long side edges, and the distances from the short side edge of the slot at the turning part to the edge of the wire which the slot is disposed therein are not equal.

According to an embodiment of the present invention, the slots comprises rectangle slots, each of the rectangle slots has two short side edges and two long side edges, the long side edges of a portion of the rectangle slots are perpendicular to the long side edges of another portion of the slots.

In the present invention, a portion of the wires in the sealant region has slots therein and the distances from the side edge of the slot to the edge of the wire which the slot is disposed therein are not equal. If the slots are designed on wire patterns of a photo mask, the slots transferred from the photo mask into the wires are not deformed because the side edges of the slots are on grid when drawing in the photo mask drawing software.

In order to make the aforementioned and other features and advantages of the present invention more comprehensible, several embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
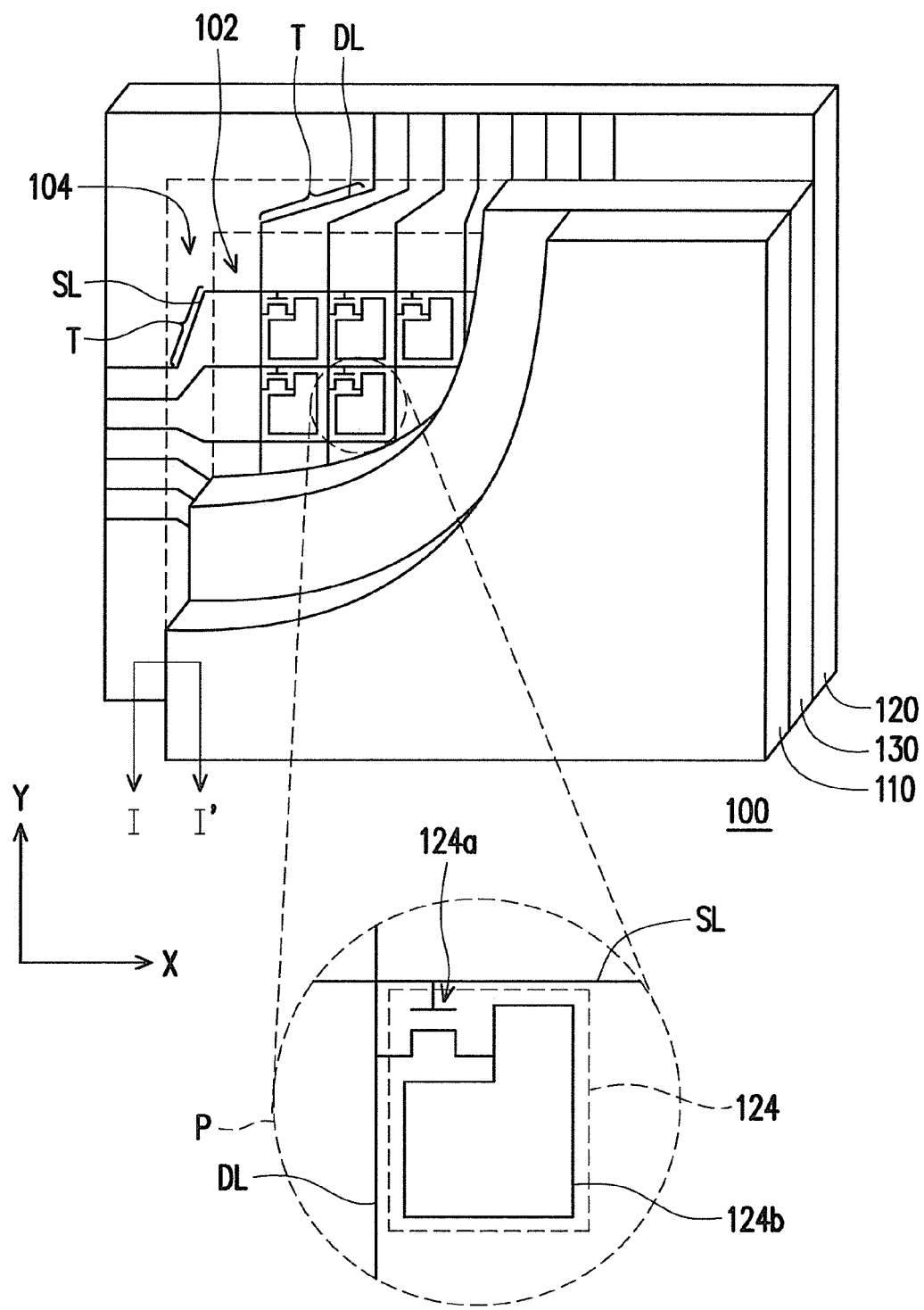
FIG. 1 is a three-dimensional diagram of a display panel according to an embodiment of the present invention.
Figure 2:
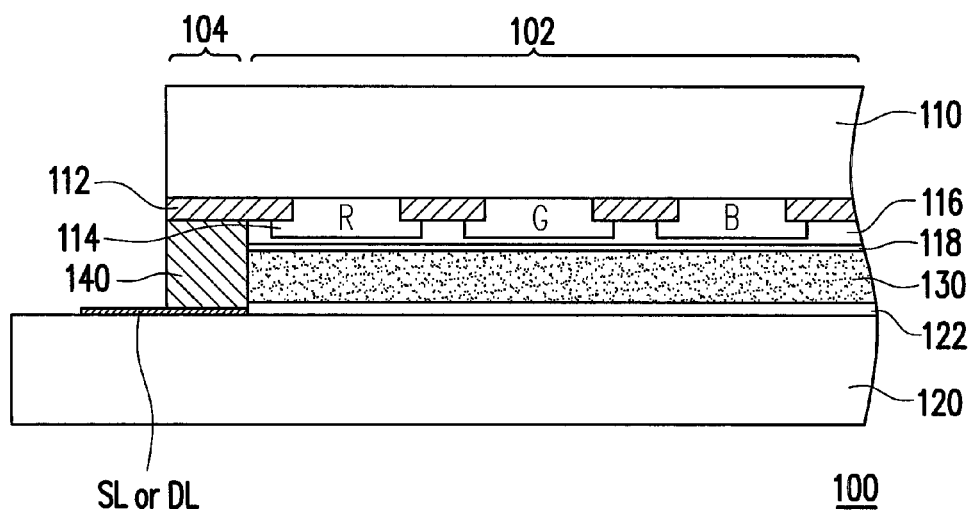
FIG. 2 is a cross-section view along I-I' of FIG. 1.

FIG. 1 is a three-dimensional diagram of a display panel according to an embodiment of the present invention. FIG. 2 is a cross-section view along I-I' of FIG. 1. Referring to FIGS. 1 and 2, the display panel 100 comprises a display region 102 and a sealant region 104 surrounding the display region 102. The display panel 100 includes a first substrate 110, a second substrate 120, a sealant 140 and a display medium 130. The first substrate 110 is disposed opposite to the second substrate 120. The sealant 140 is disposed between the first and second substrates 110, 120 and within the sealant region 104. In the embodiment, the sealant 140 is an ultraviolet curing sealant or a visible light curing sealant, for example. The display medium 130 is disposed between the first and second substrates 110, 120 and within the display region 102. In the embodiment, the display medium 130 is a liquid crystal layer, for example.

According to the embodiment, the first substrate 110 is a transparent substrate. In other embodiments, the first substrate 110 further comprises a shading pattern layer 112 and color filter patterns 114. The shading pattern layer 112 on the first substrate 110 has a pattern of lattice so as to define a plurality of unit regions. The material of the shading pattern layer 112 comprises a metal or black resin. In particular, the shading pattern layer 112 extends from the display region 102 to the sealant region 104, and thus a back exposure process illuminated from the back surface of the second substrate 120 is utilized to cure the ultraviolet curing sealant or visible light curing sealant 140 after the first and second substrates 110, 120 are assembled.

Moreover, the color filter patterns 114 on the first substrate 110 are disposed in the unit regions defined by the shading pattern layer 112. The color filter patterns 114 comprise red, green and blue filter patterns, for example. In another embodiment, the first substrate 110 further comprises a covering layer 116 and an electrode layer 118. The covering layer 116 covers the color filter patterns 114 and the shading pattern layer 112, and the electrode layer 118 is formed on the surface of the covering layer 116. The material of the covering layer 116 comprises an organic insulating material, for example, and the material of the electrode layer 118 comprises a transparent conductive layer.

The second substrate 120 includes a pixel array 122 thereon. The pixel array 122 comprises pixel units 124 and wires (such as scan lines SL and data lines DL) electrically connected to the pixel units 124, and thus the second substrate 120 is also called a pixel array substrate. In the embodiment, the pixel units 124 are within the display region 102, and each of the pixel units 124 comprises a thin film transistor (TFT) 124a and a pixel electrode 124b. The data lines DL and the scan lines SL are within the display region 102 and extend to the sealant region 104. In the display region 102, the data lines DL are electrically connected to the sources of the TFTs 124a, the scan lines SL are electrically connected to the gates of the TFTs 124a, and the pixel electrodes 124b are electrically connected to the drains of the TFTs 124a.

The scan lines SL and the data lines DL extend to the sealant region 104 from the display region, and further extend toward the edge of the substrate 120. The scan lines SL and the data lines DL at the edge of the substrate 120 are electrically connected with a driving circuit or a driving chip subsequently, such that the signals from the driving circuit or driving chip may be input into the pixel units 124 in the display region 102.

Generally, in order to meet the design of the driving circuit or driving chip, the pitch of the scan lines SL and data lines DL are gradually decreased from the display region 102 to the edge of the substrate 120, and a portion of the wires SL, DL have a turning part T. Herein, the turning part T means the extending direction thereof is not parallel to and not perpendicular to the extending directions of the wires SL, DL in the display region 102. For example, the scan lines SL in the display region 102 extend along X direction, the data lines DL in the display region 102 extend along Y direction, and the extending direction of the turning part T is not parallel to and not perpendicular to X direction or Y direction.

In the embodiment, at least a portion of the wires SL, DL in the sealant region 104 has a plurality of slots so as to increase the exposed area of the sealant 140 covering the wires SL, DL when the sealant curing process with ultraviolet or visible light is performed. In particular, the slots designed in the wires SL, DL in the present invention is much different that designed in the prior art. In the following embodiments, the scan line SL having the slots therein is described for illustration. One skilled in the art may apply the slots in the data line DL according to the following description.

Figure 3:
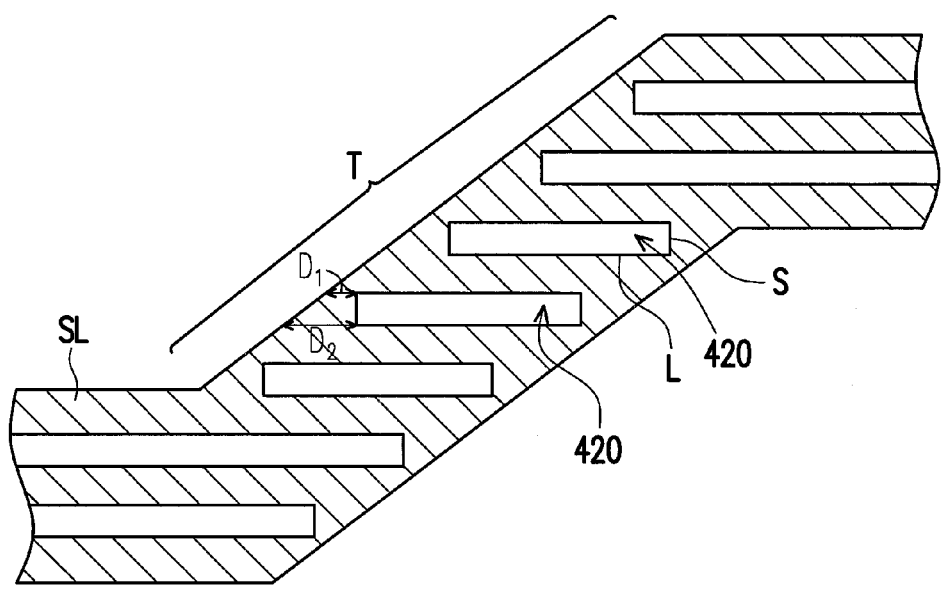
FIG. 3 is a top view of a scan line in the sealant region of a display panel according to an embodiment of the invention.

FIG. 3 is a top view of a scan line SL in the sealant region 104 of a display panel according to an embodiment of the invention. As shown in FIG. 3, the rectangle slots 420 are parallel to each other, and the areas of the rectangle slots 420 are not the same.

Particularly, the distances from the side edge of the rectangle slots 420 at the turning part T to the edge of the scan line SL which the rectangle slots 420 are disposed therein are not equal. In details, the distance D1 between the side edge of the rectangle slots 420 and the edge of the scan line SL is not equal to the distance D2 between the side edge of the rectangle slots 420 and the edge of the scan line SL. In the other words, at the turning part T of the scan line SL, the distances between any point on the side edge of the rectangle slots 420 and any point on the edge of the scan line SL are not equal.

According to the embodiment, the rectangle slot 420 at the turning part T has two short side edges S and two long side edges L, and the distances from the short side edges S of the rectangle slot 420 to the edge of the scan line SL which the rectangle slot 420 are disposed therein are not equal.

Figure 4:
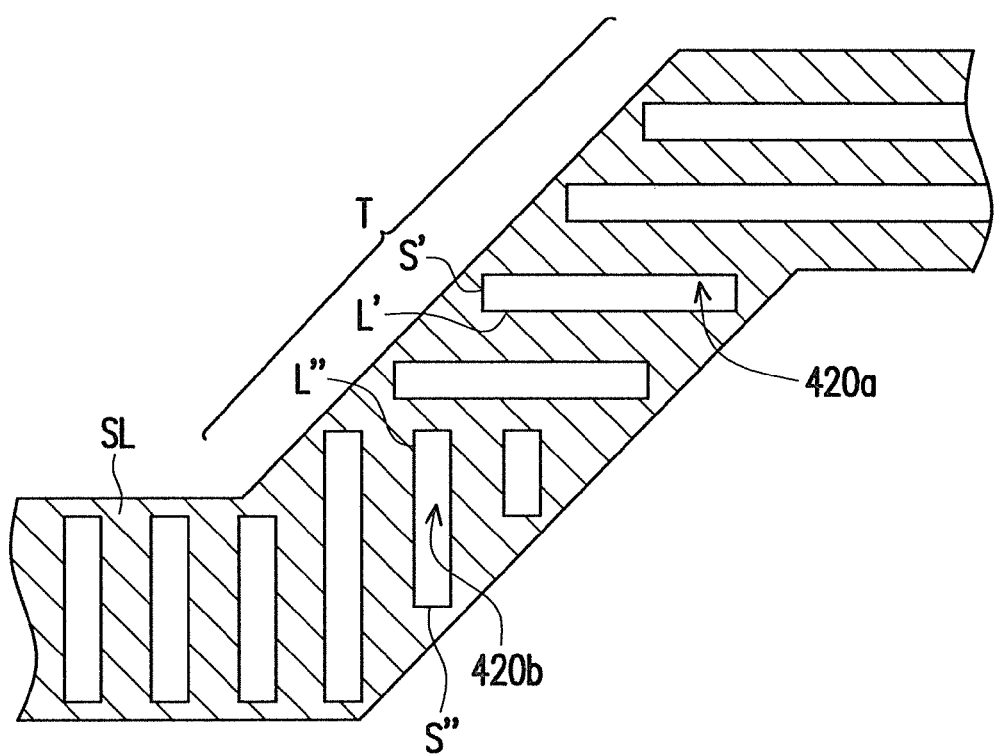
FIG. 4 is a top view of a scan line in the sealant region of a display panel according to another embodiment of the invention.

The rectangle slots 420 in the embodiment of FIG. 3 are parallel to each other, while the arrangement of the rectangle slots 420 is not limited in the present invention. In other embodiments, the rectangle slots are not completely parallel to each other. As shown in FIG. 4, the rectangle slots 420a are perpendicular to the rectangle slots 420b. The rectangle slot 420a has two short side edges S' and two long side edges L', the rectangle slot 420b has two short side edges S" and two long side edges L", and the long side edges L' of the rectangle slot 420a are perpendicular to the long side edges L" of the rectangle slot 420b.

It should be noted that, for both the rectangle slot 420a and the rectangle slot 420b in the embodiment of FIG. 4, the distances from the side edges of the rectangle slots 420a, 420b to the edge of the scan line SL which the rectangle slots 420a, 420b are disposed therein are not equal.

Figure 5:
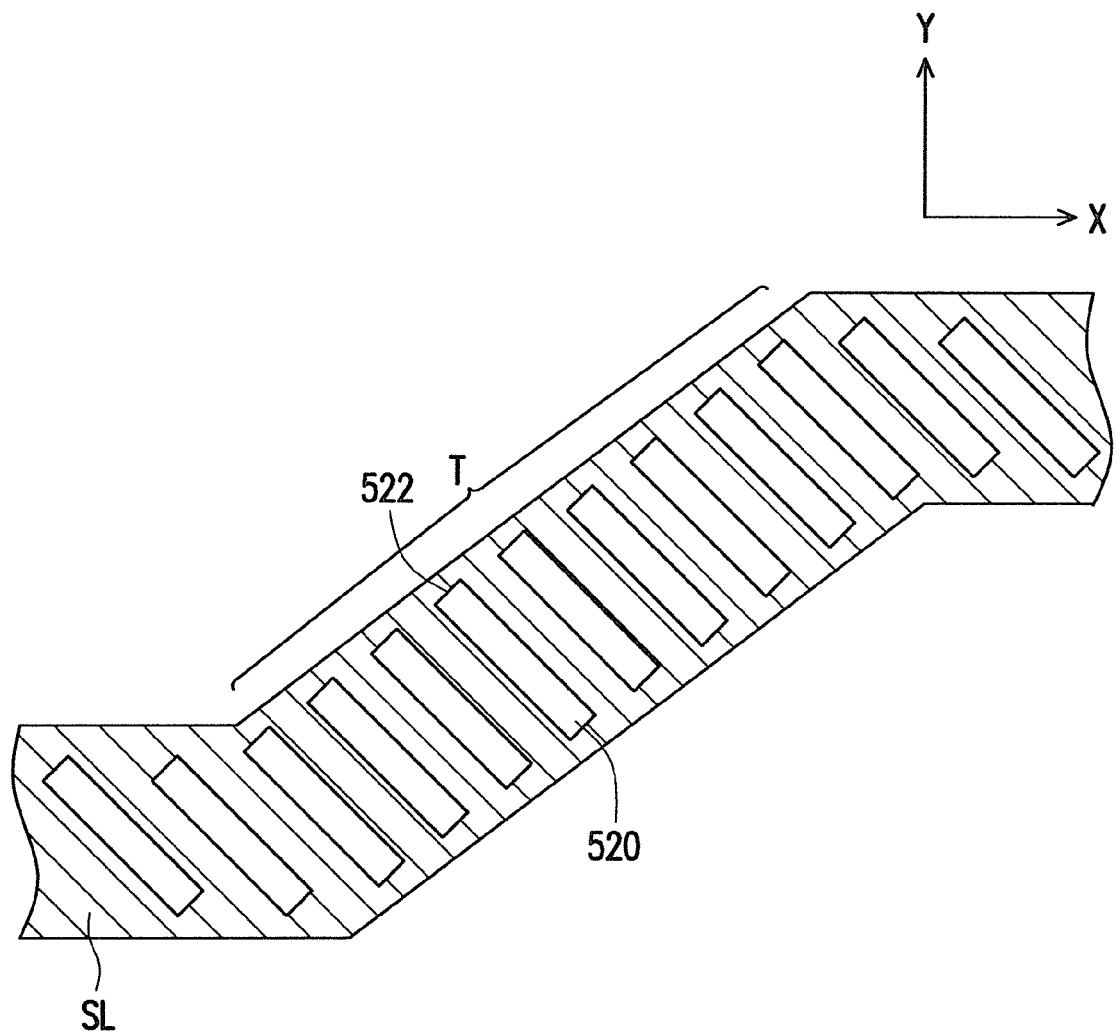
FIGS. 5-13 are top views of a scan line in the sealant region of a display panel according to other embodiments of the invention.

FIG. 5 is a top view of a scan line in the sealant region of a display panel according to another embodiment of the invention. The structure in FIG. 5 is similar to that in FIG. 4, the different between the two embodiments lies in the rectangle slots 520 are not parallel to X direction or Y direction, and the distances from the side edge 522 of the rectangle slots 520 to the edge of the scan line SL which the rectangle slots 520 are disposed therein are not equal. In addition, an included angle between any side edge of the rectangle slots 520 and X direction or Y direction is a multiple of 45°.

Figure 6:
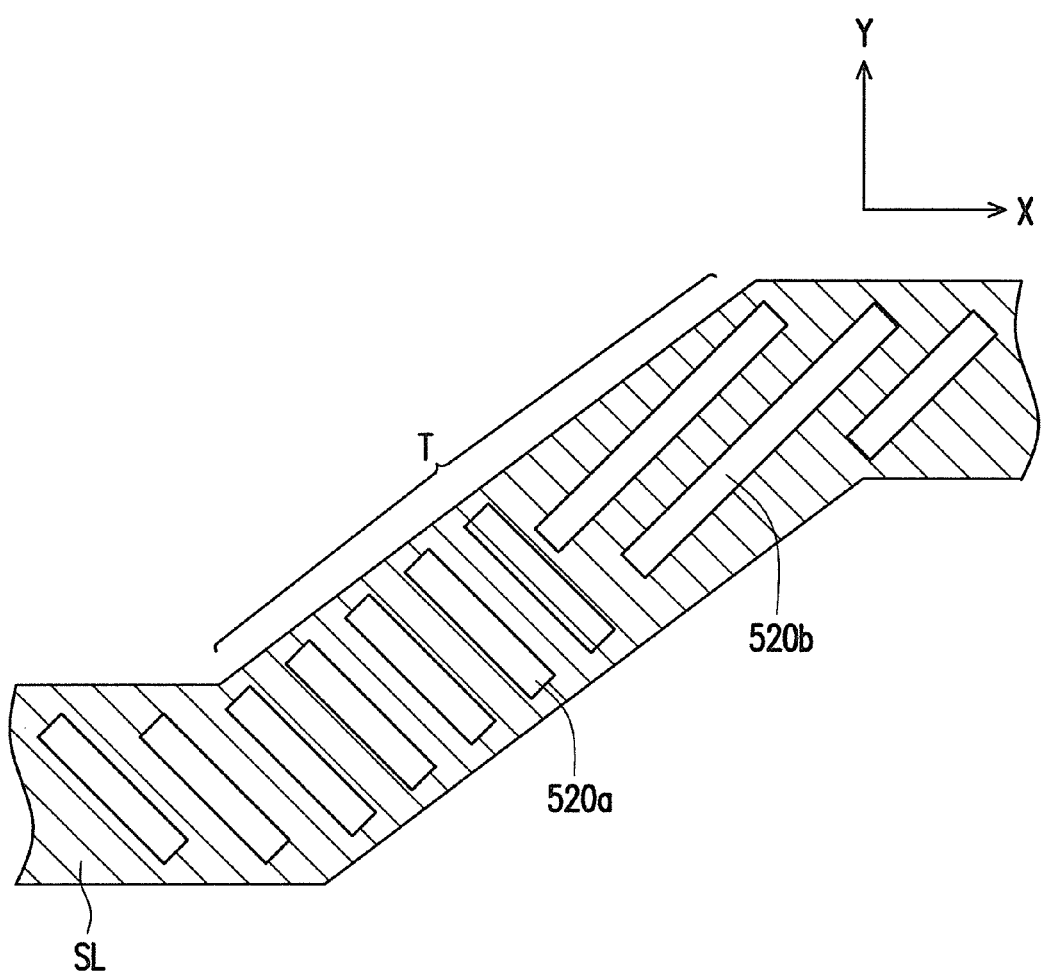

In the embodiment of FIG. 5, the rectangle slots 520 are parallel to each other. Nonetheless, the rectangle slots in the wires may not be completely parallel to each other. As shown in FIG. 6, the rectangle slots 520a and the rectangle slots 520b are perpendicular to each other.

Figure 7:
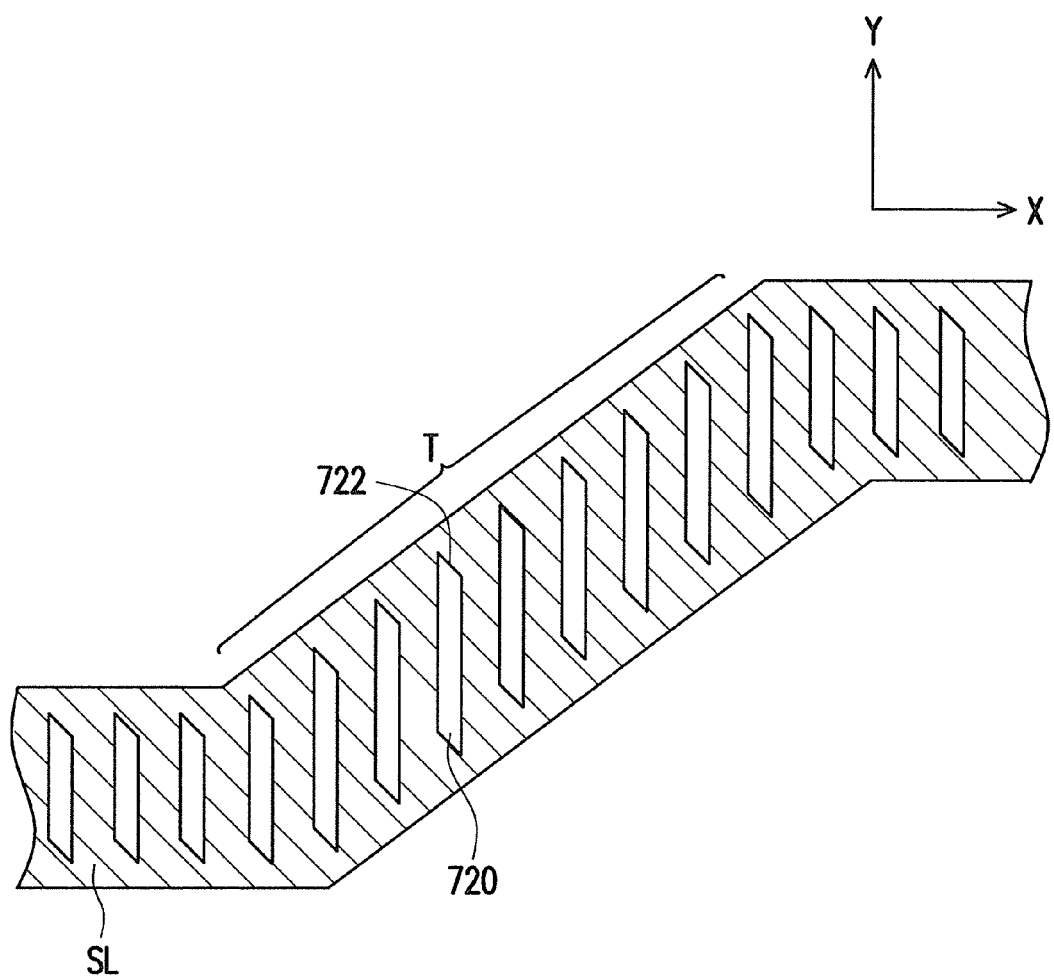

The slots described in the above embodiments are rectangle slots, while the shape of the slots is not limited in the present invention. According to another embodiment, the slots may be parallelogram slots. As shown in FIG. 7, the slots 720 in the scan line SL are parallelogram slots, and the distances from the side edge 722 of the parallelogram slot 720 to the edge of the scan line SL which the rectangle slot 720 is disposed therein are not equal. In addition, an included angle between any side edge of the parallelogram slots 720 and X direction or Y direction is a multiple of 45°.

Figure 8:
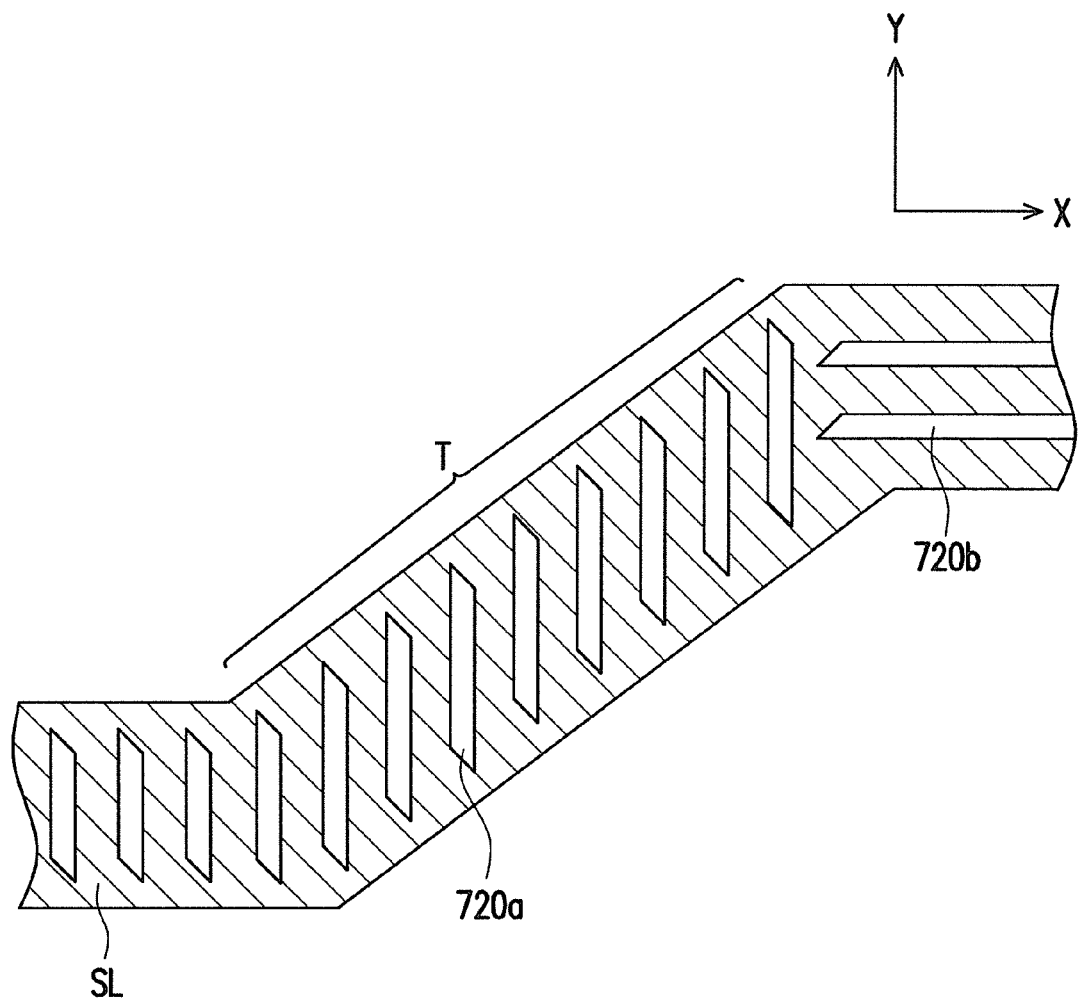

In the embodiment of FIG. 7, the parallelogram slots 720 are parallel to each other. Nonetheless, the parallelogram slots in the wires may not be completely parallel to each other. As shown in FIG. 8, the parallelogram slots 720a are perpendicular to the parallelogram slots 720b.

Figure 9:
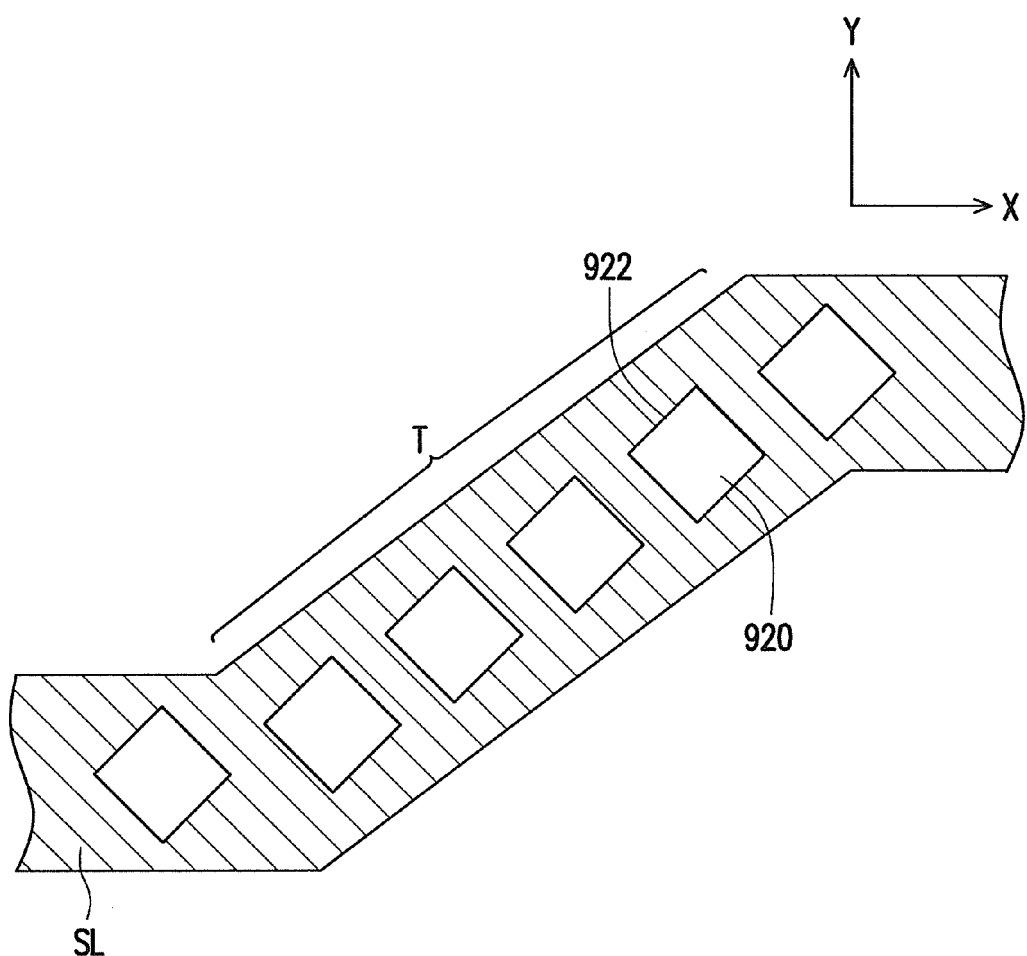

According to another embodiment, the slots in the wires are square slots. As shown in FIG. 9, the slots 920 in the scan line SL are square slots, and the distances from the side edge 922 of the square slot 920 to the edge of the scan line SL which the rectangle slot 920 is disposed therein are not equal. In addition, an included angle between any side edge of the square slot 920 and X direction or Y direction is a multiple of 45°.

Figure 10:
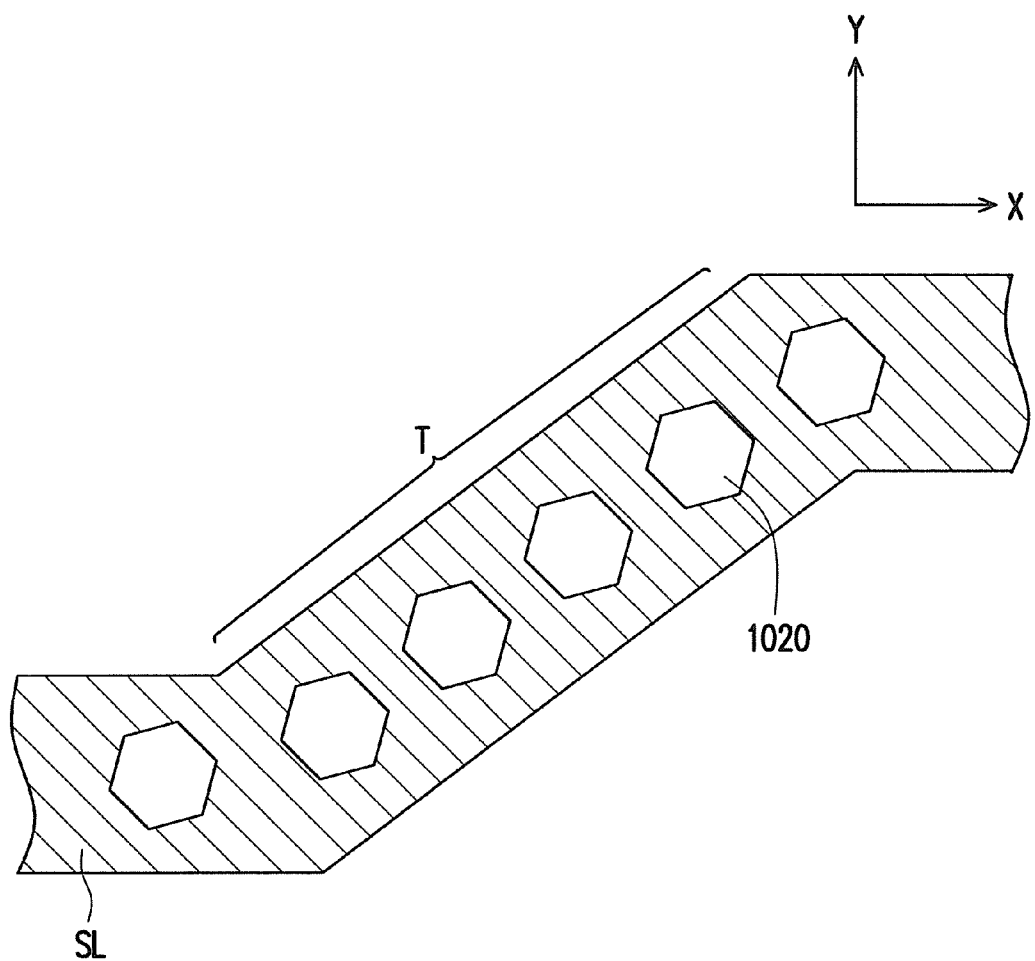

In addition, in another embodiment, the slots in the wires are hexagon slots or octagon slots. As shown in FIG. 10, the slots 1020 in the scan line SL are hexagon slots, and the distances from the side edge of the hexagon slot 1020 to the edge of the scan line SL which the hexagon slot 1020 is disposed therein are not equal. In addition, an included angle between any side edge of the hexagon slot 1020 and X direction or Y direction is a multiple of 45°.

Figure 11:
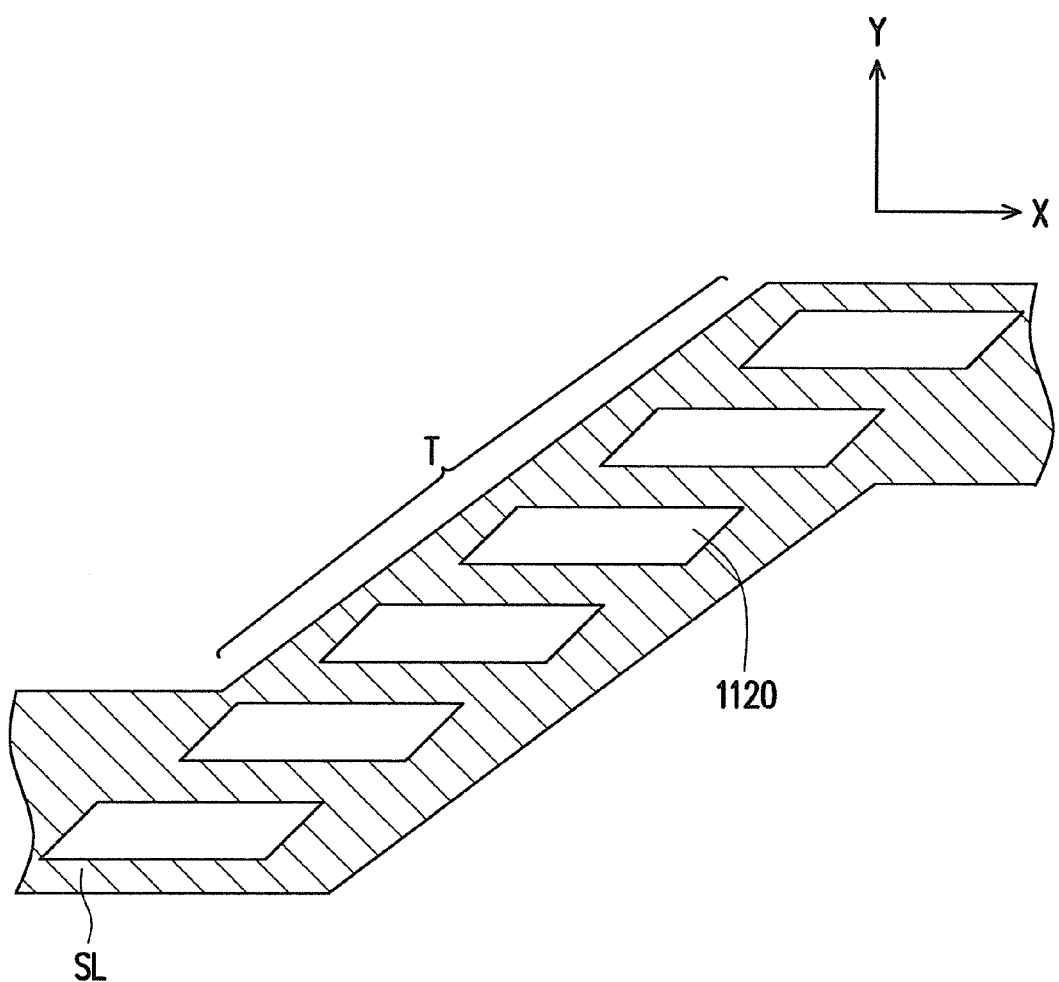

In the embodiment of FIG. 11, the slots in the wires are parallelogram slots 1120, and the distances from the side edge of the parallelogram slot 1120 to the edge of the scan line SL which the parallelogram slot 1120 is disposed therein are not equal.

Figure 12:
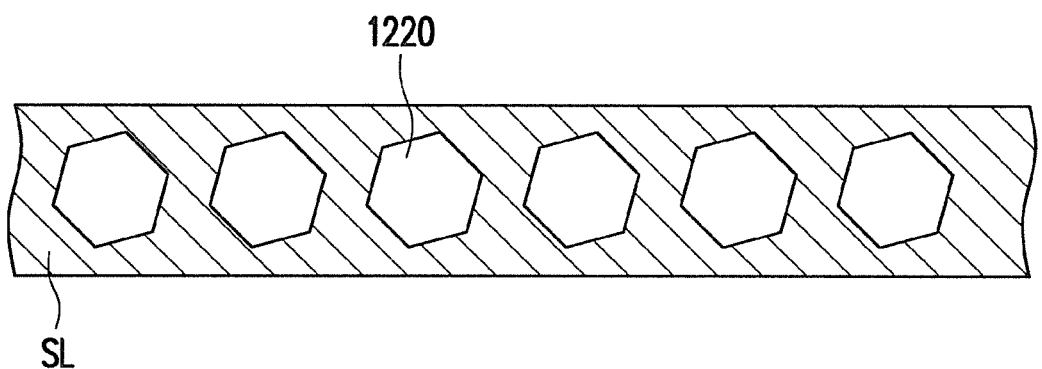
Figure 13:
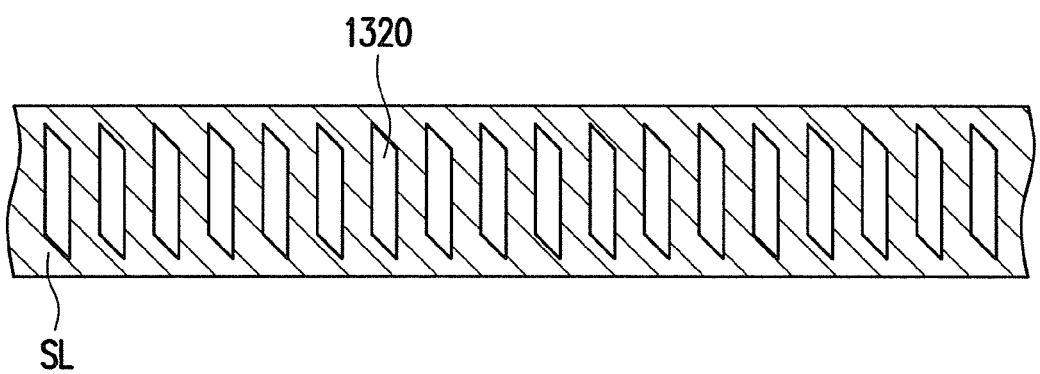

The slots described in the above embodiments are located at the turning part T of the wires, wherein the distances from the side edge of the slot to the edge of the wire which the slot is disposed therein are not equal. However, it does not limit the present invention. In the other embodiments, the slots may also be formed at the non-turning part of the wires, so as to increase the exposed area of the sealant on the wires when the ultraviolet or visible light curing process is performed. As shown in FIGS. 12 and 13, the slots 1220, 1320 are located at the non-turning part of the wire, and the distances from the side edge of the slots 1220, 1320 to the edge of the wire which the slots 1220, 1320 are disposed therein are not equal.

In light of the foregoing, the slots in the wires in the sealant region has the feature of the distances from the side edge of the slot to the edge of the wire which the slot is disposed therein are not equal. If the slots are designed on wire patterns of a photo mask, the slots transferred from the photo mask into the wires are not deformed because the side edges of the slots are on grid when drawing in the photo mask drawing software.

Furthermore, when the design rule checking is performed, errors found from the design rule checking tool can be avoided because the slots transferred from the photo mask are not deformed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display panel, having a display region and a sealant region surrounding the display region, comprising:
   a first substrate;
   a second substrate, comprising a plurality of pixel units and a plurality of wires electrically connected to the pixel units, the pixel units being disposed within the display region, the wires extending to the sealant region from the display region, and at least a portion of the wires in the sealant region having slots, wherein each of the slots has a side edge adjacent to the edge of the wire where the slot is disposed, and the distances from the side edge to the edge of the wire are not equal;

a sealant, disposed between the first and second substrates and within the sealant region; and a display medium, disposed between the first and second substrates and within the display region, wherein at least a portion of the wires has a turning part in the sealant region, and an extending direction of the wires in the display region is different from an extending direction of the turning part, and an included angle between the side edge of the slot in the turning part and the extending direction of the wires in the display region is 45° or 135°.

2. The display panel as claimed in claim 1, wherein the slots have a shape of rectangle, square, parallelogram, hexagon or octagon.

3. The display panel as claimed in claim 1, wherein the slots are parallel to each other.

4. The display panel as claimed in claim 1, wherein a portion of the slots is perpendicular to another portion of the slots.

5. The display panel as claimed in claim 1, wherein the areas of the slots are not the same.

6. The display panel as claimed in claim 1, wherein at least a portion of the wires has a turning part, and the slots are disposed at the turning part.

7. The display panel as claimed in claim 6, wherein the slots comprises rectangle slots, each of the rectangle slots has two short side edges and two long side edges, and the distances from the short side edge of the slot at the turning part to the edge of the wire which the slot is disposed therein are not equal.

8. The display panel as claimed in claim 6, wherein the slots comprises rectangle slots, each of the rectangle slots has two short side edges and two long side edges, the long side edges of a portion of the rectangle slots are perpendicular to the long side edges of another portion of the slots.

9. The display panel as claimed in claim 1, wherein the wires comprises data lines and scan lines.

10. The display panel as claimed in claim 1, wherein the sealant comprises an ultraviolet curing sealant or a visible light curing sealant.

11. The display panel as claimed in claim 1, wherein the first substrate further comprises a shading pattern layer thereon, and the shading pattern layer is disposed within the display region and the sealant region.

12. A pixel array substrate, comprising:

a substrate, having a display region and a sealant region;

a plurality of pixel units, disposed in the display region; and a plurality of wires, electrically connected to the pixel units, the wires extending to the sealant region from the display region, and at least a portion of the wires in the sealant region having slots, wherein each of the slots has a side edge adjacent to the edge of the wire where the slot is disposed, and the distances from the side edge to the edge of the wire are not equal, wherein at least a portion of the wires has a turning part in the sealant region, and an included angle between the side edge of the slot in the turning part and an extending direction of the wires in the display region is 45° or 135°.

13. The pixel array substrate as claimed in claim 12, wherein the slots have a shape of rectangle, square, parallelogram, hexagon or octagon.

14. The pixel array substrate as claimed in claim 12, wherein the slots are parallel to each other.

15. The pixel array substrate as claimed in claim 12, wherein a portion of the slots is perpendicular to another portion of the slots.

16. The pixel array substrate as claimed in claim 12, wherein the areas of the slots are not the same.

17. The pixel array substrate as claimed in claim 12, wherein the wires comprises data lines and scan lines.

18. The pixel array substrate as claimed in claim 12, wherein at least a portion of the wires has a turning part, and the slots are disposed at the turning part.

19. The pixel array substrate as claimed in claim 18, wherein the slots comprises rectangle slots, each of the rectangle slots has two short side edges and two long side edges, and the distances from the short side edge of the slot at the turning part to the edge of the wire which the slot is disposed therein are not equal.

20. The pixel array substrate as claimed in claim 18, wherein the slots comprises rectangle slots, each of the rectangle slots has two short side edges and two long side edges, the long side edges of a portion of the rectangle slots are perpendicular to the long side edges of another portion of the slots.

* * * * *